(12) United States Patent
Jensen (10) Patent No.: US 6,601,523 B2
(45) Date of Patent: Aug. 5, 2003

(54) EASY CLEANABLE FOOD TRAY

(75) Inventor: Tom M. Jensen, Everett, WA (US)

(73) Assignee: The Boeing Company, Seattle, WA (US)

( * ) Notice: Subject to any disclaimer, the term of this patent is extended or adjusted under 35 U.S.C. 154(b) by 0 days.

(21) Appl. No.: 10/016,031

(22) Filed: Dec. 12, 2001

(65) Prior Publication Data

US 2003/0106469 A1 Jun. 12, 2003

(51) Int. Cl.[7] .............................................. A47B 23/00
(52) U.S. Cl. ......................... 108/44; 108/152; 297/146
(58) Field of Search .............................. 108/44, 43, 47, 108/48, 42, 152; 297/146, 188.04, 163

(56) References Cited

U.S. PATENT DOCUMENTS

| | | | |
|---|---|---|---|
| 1,780,706 A | * | 11/1930 | Goldbecher |
| 1,790,468 A | * | 1/1931 | Frank et al. |
| 1,809,866 A | * | 6/1931 | Riesche |
| 3,795,422 A | * | 3/1974 | Robinson et al. |
| 4,159,071 A | | 6/1979 | Roca |
| 4,281,874 A | | 8/1981 | Iwans et al. |
| 4,431,231 A | | 2/1984 | Elazari et al. |
| 4,511,178 A | | 4/1985 | Brennan |
| 4,726,621 A | * | 2/1988 | Muller |
| 5,133,587 A | * | 7/1992 | Hadden, Jr. |
| 5,876,092 A | | 3/1999 | An |
| 5,931,527 A | * | 8/1999 | D'Onofrio et al. |
| 5,954,394 A | * | 9/1999 | Czyzewskie |
| 6,085,666 A | * | 7/2000 | Anderson et al. |

\* cited by examiner

Primary Examiner—Jose V. Chen
(74) Attorney, Agent, or Firm—Black Lowe & Graham, PLLC (57) ABSTRACT

A table that is stowable and deployable from a seatback of a passenger seat includes a substantially planar food tray with a first surface and a second surface substantially parallel to the first surface. The tray is stowed in a substantially vertical position with the first surface facing a seated passenger. The stowed tray is held in position with a moveable switch engaged against the first surface. A device for stowing and deploying the tray is mounted on the second surface. A pair of legs is mounted to the device. Each leg has a first end attached to the device and a second end attached to the seat. Upon turning the switch clear of the first surface, the device slidably urges the first surface from its stowed position to a deployed, substantially horizontal position, with the first surface facing upwards.

21 Claims, 7 Drawing Sheets

EASY CLEANABLE FOOD TRAY

FIELD OF THE INVENTION

This invention relates generally to embodiments of a passenger seat food tray.

BACKGROUND OF THE INVENTION

Existing food trays for airplanes are stowed in a recess of a seatback of an airplane. When stowed, a top surface of the tray faces inwardly toward the seatback. Thus, the top surface of the tray is inaccessible to airline personnel who clean airplanes. To clean a tray, airline personnel must unhinge the tray, lower the tray, clean the tray, and re-stow the tray. This cycle of unhinging, lowering, cleaning, and re-stowing each tray decreases efficiency of an airplane cleaning operation. These inefficient cleaning operations cost airlines time and money when turning an airplane around for receiving a next set of passengers.

Thus, there is an unmet need in the art for a food tray that can be rapidly wiped down and cleaned while the tray is stowed, thereby avoiding unnecessary steps and lost time spent unhinging and lowering the food tray for cleaning and re-stowing the food tray after it has been cleaned.

SUMMARY OF THE INVENTION

According to an aspect of the invention, a table is stowable and deployable from a seatback of a passenger seat. The table includes a substantially planar food tray with a first surface and a second surface substantially parallel to the first surface. The tray is stowed in the seatback in a substantially vertical position with the first surface facing outward towards a seated passenger, thereby permitting easy access cleaning of the first surface while in the stowed position. The vertically stowed tray is held in position with a moveable switch engaged against the first surface. A positioning means is mounted on the second surface which operates in stowing and deploying the tray. A pair of legs is attached to the positioning means, each leg having a first attached to the positioning means, and a second end attached to the seat. Upon turning the moveable switch clear of the first surface, the positioning means slidably urges the first surface from its stowed, substantially vertical position, to a deployed, substantially horizontal position, with the first surface facing upwards.

According to another aspect of the invention, a table is fitted with a means for rapidly detaching the tray for maintenance or replacement. A table is stowable and deployable from a seatback of a passenger seat. The table includes a substantially planar food tray with a first surface and a second surface substantially parallel to the first surface. The tray is stowed in the seatback in a substantially vertical position with the first surface facing outward towards a seated passenger, thereby permitting easy access for cleaning the first surface while in the stowed position. The vertically stowed tray is held in position with a moveable switch engaged against the first surface. A positioning means which operates in stowing and deploying the tray is mounted on the second surface. A pair of legs to the positioning means is attached a pair of legs, each leg having a first end attached to the positioning means, and a second end attached to the seat. Upon turning the moveable switch clear of the first surface, the positioning means slidably urges the first surface from its stowed, substantially vertical position, to a deployed, substantially horizontal position, with the first surface facing upwards. The means to rapidly detach the tray for maintenance or replacement includes a quick release mechanism that detaches the tray from and reattaches the tray to the pair of legs.

According to another aspect of the invention a table is substantially unaffected by seatback tilting caused by a forward seated passenger. A table is stowable and deployable from the seatback of the passenger seat. The table includes a substantially planar food tray with a first surface and a second surface substantially parallel to the first surface. The tray is stowed in the seatback in a substantially vertical position with the first surface facing outward towards a seated passenger, thereby permitting easy access for cleaning the first surface while in the stowed position. The vertically stowed tray is held in position with a moveable switch engaged against the first surface. To the second surface is mounted a positioning means which operates in stowing and deploying the tray. A positioning means which operates in stowing and deploying the tray is mounted on the second surface. A pair of legs, each leg having a first end attached to the positioning means, and a second end attached to a stationary region of the seat, is attached to the positioning means. Upon turning the moveable switch clear of the first surface, the positioning means slidably urges the first surface from its stowed, substantially vertical position to a deployed, substantially horizontal position, with the first surface facing upwards. The deployed, substantially horizontal position is substantially unaffected by tilting caused by the forward seated passenger. A means for rapidly detaching the tray for maintenance or replacement is provided, and includes a quick release mechanism. The quick release mechanism detaches the tray from and reattaches the tray to the pair of legs.

BRIEF DESCRIPTION OF THE DRAWINGS

The preferred and alternative embodiments of the invention are described in detail below with reference to the following drawings.

DETAILED DESCRIPTION OF THE INVENTION

Figure 1:
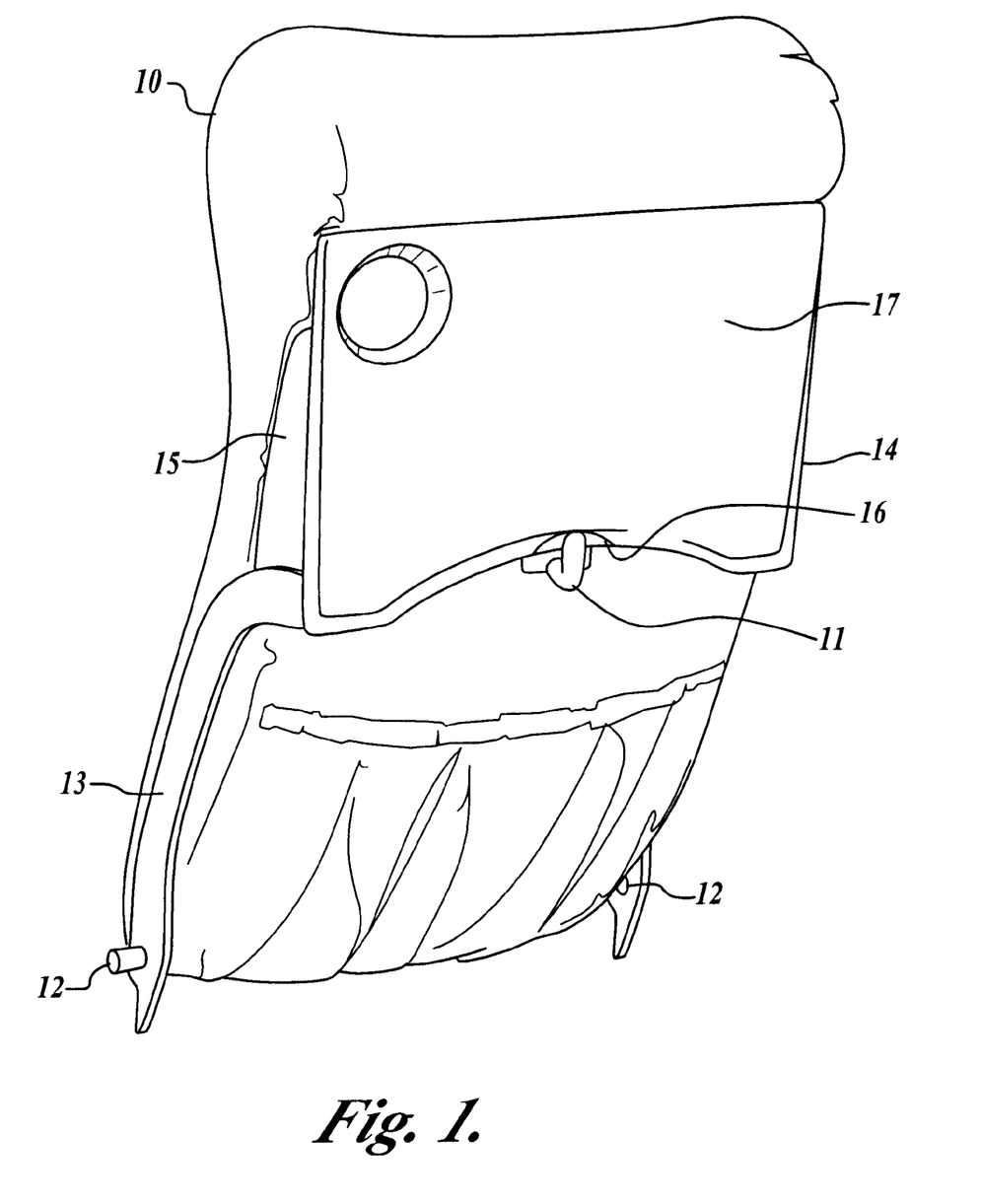
FIG. 1 is the invention in a stowed position of a seat back wherein the food-serving surface is facing outward.

A tray 14 is shown in FIG. 1. A food-serving surface 17 of the tray 14 faces outward when vertically stowed in the recess of a seatback in seat 10. A toggle 11 is turned upwards in an engaged position against latch 16. Beneath the food-serving surface 17 resides a housing panel 15 that contains the mechanical components and assemblies of a positioning mechanism that deploys and stows the tray. The housing panel 15 is attached to tray legs 13 which are held in position to seat 10 via pivot pins 12.

Figure 2:
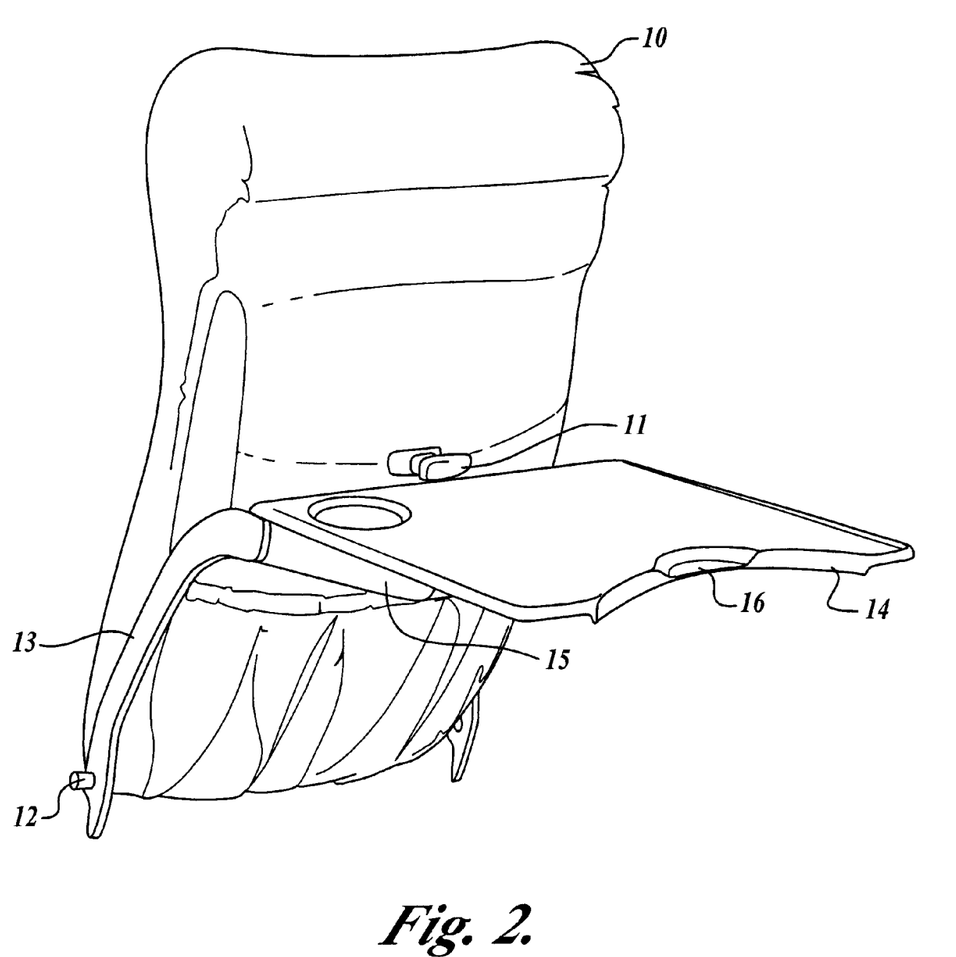
FIG. 2 is the invention in a deployed position.

The tray 14 in a deployed position is shown in FIG. 2. After the food service tray toggle 11 is rotated clear of the latch 16, the tray 14 migrates in an incrementally sliding motion to a substantially level position toward a passenger's lap. The incremental sliding motion is achieved with the positioning mechanism (not shown) located within the housing panel 15. The incremental sliding motion occurs about the tray legs 13 that are connected to the seat 10 via the pivot pins 12 mounted through a hole (not shown) in each tray leg 13.

Figure 3:
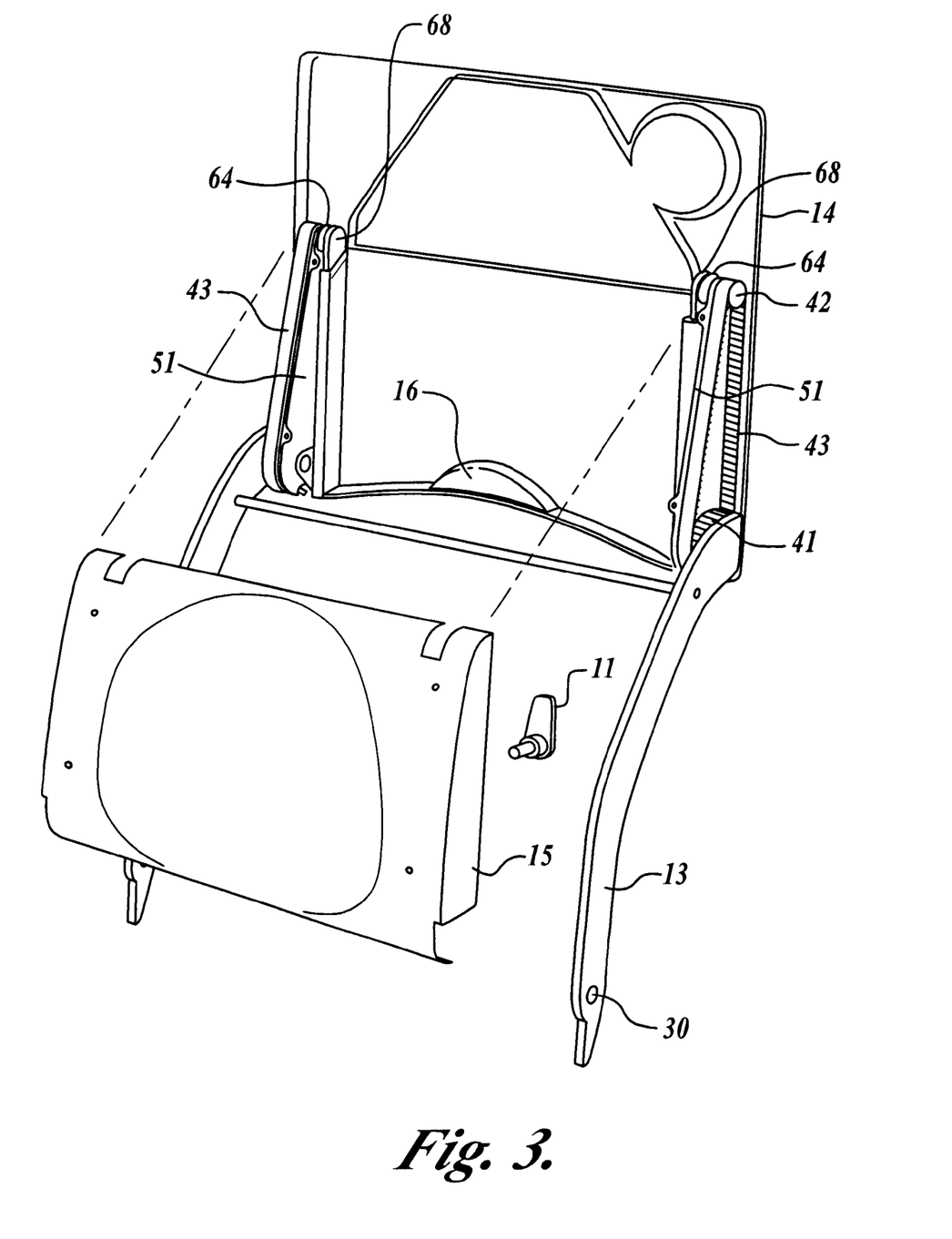
FIG. 3 is the inner working mechanisms of the invention.

FIG. 3 is an exploded view that shows the interior view of the housing panel 15 removed from the bottom of tray 14. The structural relationship of the toggle 11 is shown in relation to a side underneath the latch 16. Several of the components visible in the positioning mechanism include two timing belts 43 located on each underside of tray 14. Each timing belt 43 meshes with a fixed timing pulley 41 that is secured to tray leg 13, and then meshes with a planetary timing pulley 42. Planetary timing pulleys are rotationally connected to wrist sheave 64 and tray slide arm 68. The spring (not shown) and cable components (not shown) interact with arm 51. A shaft (not shown) of pulley 41 and an axle (not shown) of pulley 42 are engaged with elbow pivot (not shown) and wrist pivot (not shown), respectively, of arm 51. The engagement of the shaft and axles of pulleys 41 and 42 with elbow and wrist pivots of arm 51 maintains a constant inter-pulley distance between pulleys 41 and 42. A hole 30 is shown in tray leg 13 in which the pivot pins (not shown) are mounted.

Figure 4A:
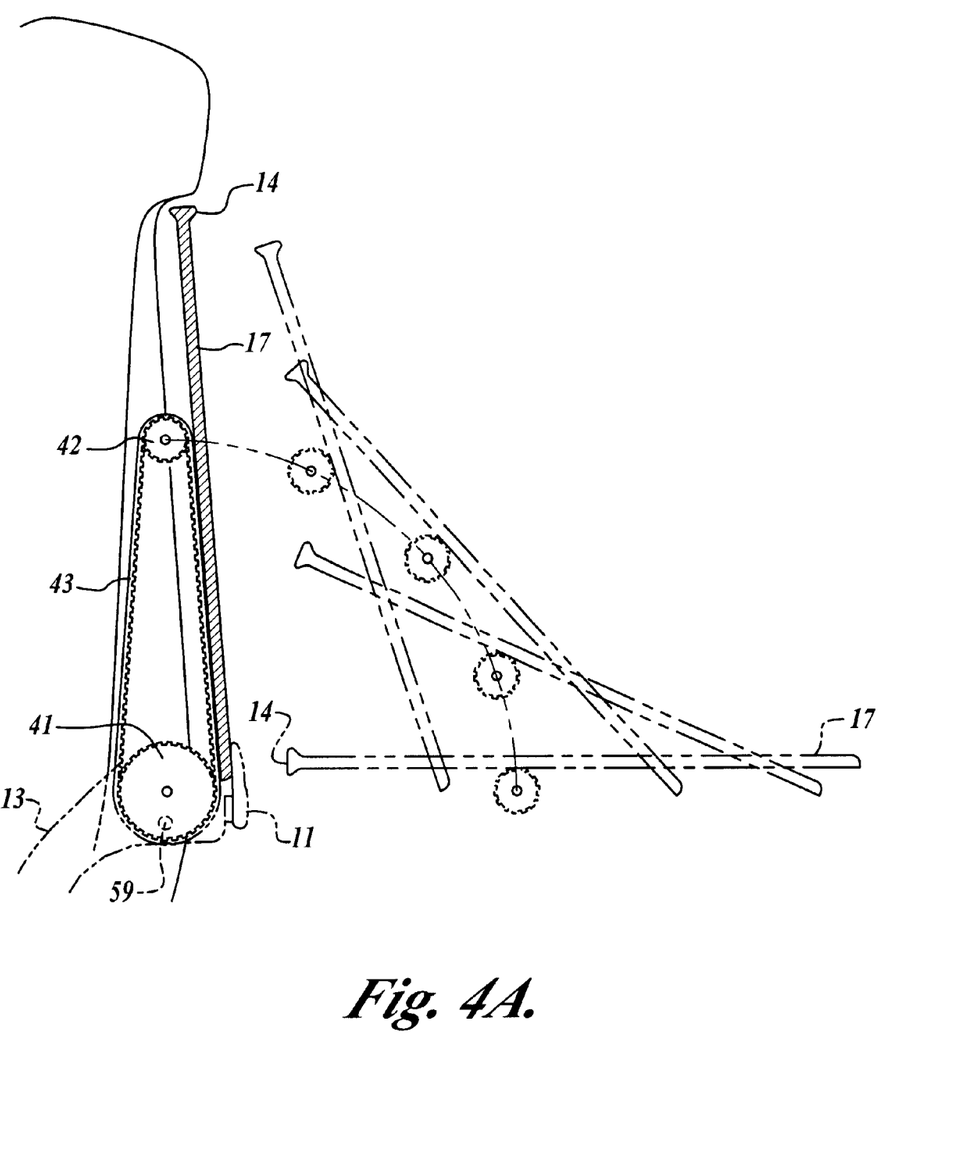
FIG. 4A is a side view of the planetary transport mechanism moving the invention between a stowed position to a deployed position.
Figure 4B:
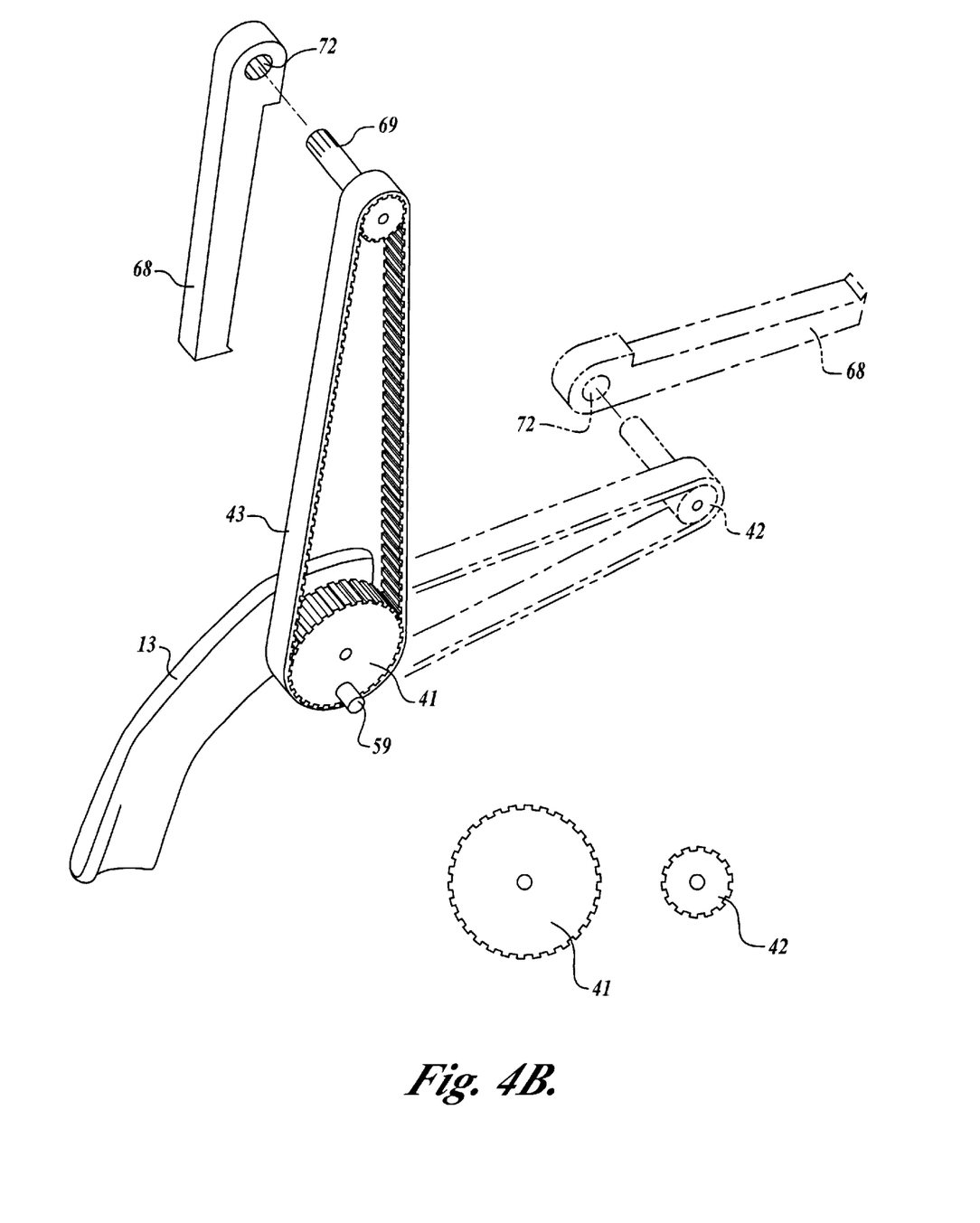
FIG. 4B is an angled view of the timing belt and gearing mechanism.

Incremental sliding motion imparted by the positioning mechanism is depicted in FIGS. 4A and 4B. Referring to FIG. 4A, fixed timing pulley 41 keeps timing belt 43 fixed, and, together with arm 51 (not shown), establishes planetary pulley 42 to maintain a substantially constant inter-pulley distance from timing pulley 41. As toggle 11 turns clear of its latch, tray 14 is gravitationally urged downward and causes timing belt 43 to partially wrap around timing pulley 41, thereby changing the pivot point of timing belt 43. Planetary pulley 42 is then gravitationally urged downward from the changing pivot point, but a substantially constant inter-pulley distance is maintained. Thus, planetary pulley 42 rotates around the fixed timing pulley and fixed timing belt 43, but from a changing pivot point. The wrapping movement of timing belt 43 is transmitted to the fixed pulley 41 and the planetary pulley 42, wherein meshing of each pulley's teeth with the belt's slots imparts an incremental sliding motion to the sliding tray 14 as it is urged gravitationally downward. This in turn causes a ratcheting action of the planetary timing pulley 42 as timing pulley 42 migrates within the fixed loop path of timing belt 43. The resultant action is the transit of the tray 14 from a substantially vertical position to a substantially horizontal position as indicated in the angle depictions, and is determined by the gearing ratios of timing pulley 41 and planetary pulley 43. The end of the horizontal transit is controlled by a fitting 59, such as a stop pin, that is attached to the fixed timing pulley 41 as tray 14 pivots towards a horizontal position about tray leg 13. When downward travel of tray 14 stops, the food serving surface 17 of tray 14 is in a substantially horizontal position and faces upwardly.

Other components of the positioning mechanism are shown in FIG. 4B. Timing pulley 41 is attached to tray legs 13. Timing belt 43 wraps about fixed timing pulley 41 with the fitting 59. The timing belt, in turn, causes the planetary timing pulley 42 to rotate. The rotation of the planetary timing pulley 42 is transmitted to a planetary axle 69. Axle 69 has a plurality of stepped, smooth surfaces and a splined end. The splined end of axle 69 meshes with a wrist spline hole 72 of tray slide arm 68. Rotation of the axle 69 results in the circular rotation of tray slide arm 68 from an approximately 0 degree parallel position to the timing belt 43 (wherein the end of tray arm 68 is substantially even with fixed pulley 41) to an approximately 180 degree parallel position to timing belt 43 (wherein the end of tray arm 68 is located in a linear configuration with pulley 42 and pulley 41). As the rotation of tray slide arm 68 occurs about timing belt 43, arm 68 migrates from a substantially vertical position to a substantially horizontal position in relation to the upper end of tray arm 13. The angle that results between the deployed position and the stowed position is determined by the gearing ratio between the fixed turning pulley 41 and the planetary timing pulley 42.

Figure 5:
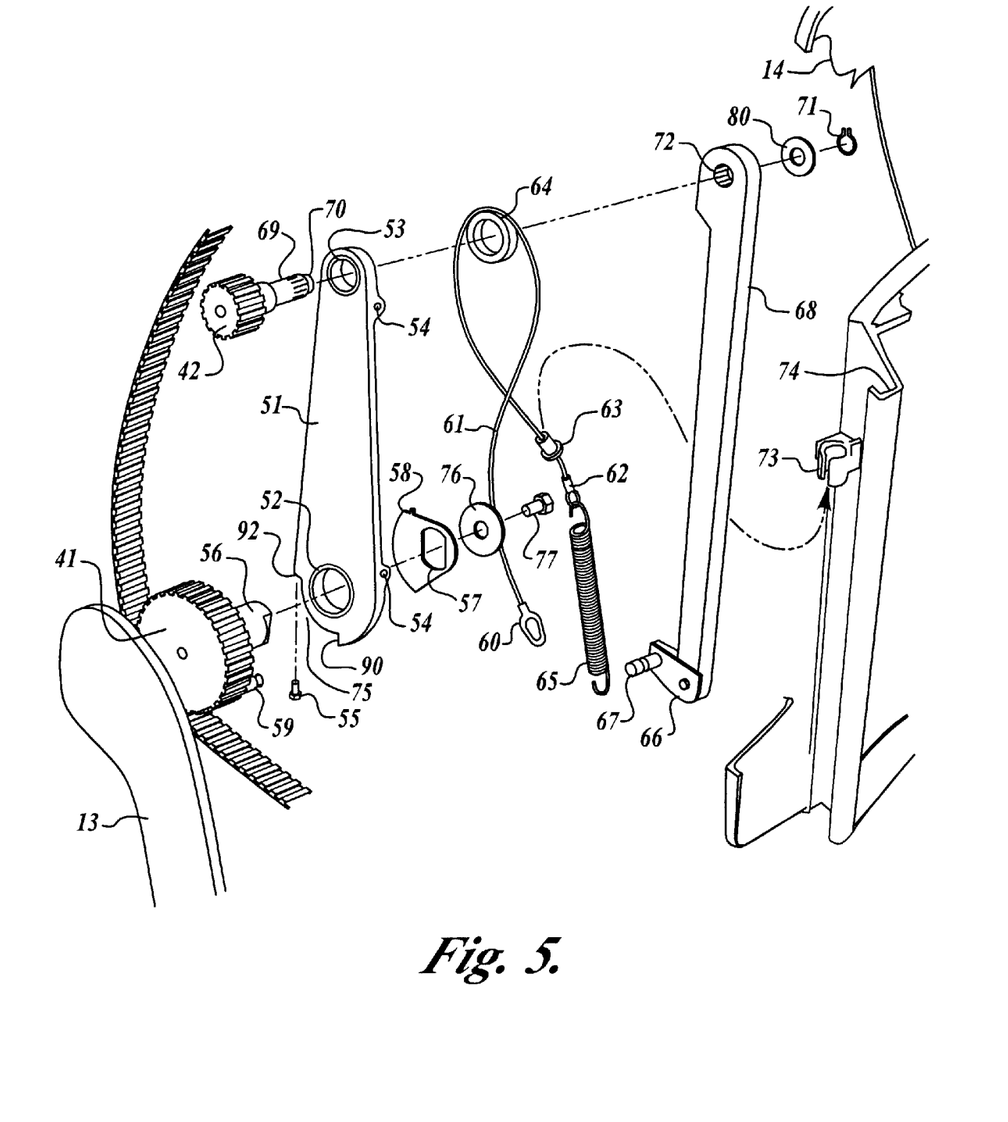
FIG. 5 is an expanded view of the timing belt components of the invention.

FIG. 5 shows in greater detail the positioning mechanism. The fixed pulley 41 and the planetary timing pulley 42 are shown in relation to arm 51 that is mounted to the underside of tray 14 via bolts placed through arm mounting holes 54. Fixed timing pulley 41 has a double-D shaft 56 that is inserted through elbow pivot 52, then to a cam-shaped fixed sheave 58 having a shaft aperture 57, followed by washer 76, which are all secured via bolt 77. The fitting 59 of pulley 41 runs in the track provided by cutout 75 in arm 51. The fitting 59 migrates between a lower extreme edge 90 and an upper extreme edge 92 of cutout 75. Tray level adjust bolt 55 adjusts the lap-level placement of the tray 14.

Inserted into wrist spline hole 72 is the splined end of axle 69 that is attached to planetary timing pulley 42. The internal multi-stepped smooth surfaces of axle 69 mesh with the sliding surfaces of bushings in wrist pivot 53 and cable sheave 64. The planetary timing pulley 42 has an external flip groove 70 that aids in its engagement with wrist pivot 53. The multi-stepped smooth surfaces of axle 69 provide matches with the smooth surfaces provided by the bushings of wrist pivot 53 and wrist sheave 64 of arm 51. The multi-stepped surface of the axle 69 meshes with the wrist sheave bushing 64, then to the wrist splines 72 of tray slide arm 68. The planetary timing pulley assembly is then secured to tray slide arm 68 with a washer 80 and C-clip 71.

Tray slide arm 68 contains a tray slide arm end 66 upon which a spring anchor pin fitting 67 is attached. Fitting 67 is connected to a spring 65 that in turn is connected to a draw cable 61 via cable loop 62. The draw cable 61 is routed over the outer groove of wrist sheave 64, thence back to fitting 59 that is attached via cable attachment catch 60. Cable slide fitting 63 is able to migrate along cable 61. Tray slide arm 68 is mounted in a tray slot 74 located beneath tray 14. Attached to the tray slot 74 is a tray draw fitting 73 attached. Fitting 73 engages with the moveable cable slide fitting 63 as the cable and spring are subjected to decreasing tension as the tray 14 is deployed or increasing tension during use and storing of tray 14.

When tray 14 is in a stowed position, the spring 65 is stretched more than when tray 14 is in a deployed position. When tray 14 is deployed, the incremental sliding motion results in rotation of the fixed timing pulley 41 within confines imposed by cutout 75 of arm 51. Arm 51's rotary movement is limited by fitting 59 that limits pivotal motion to the extreme edges of cutout 75 of arm 51. During deployment of the tray 14, arm 51's lower rotation movement is limited as edge 90 meets fitting 59. During stowage of the tray 14, arm 51's upper rotation movement is limited as edge 92 meets fitting 59.

Figure 6A:
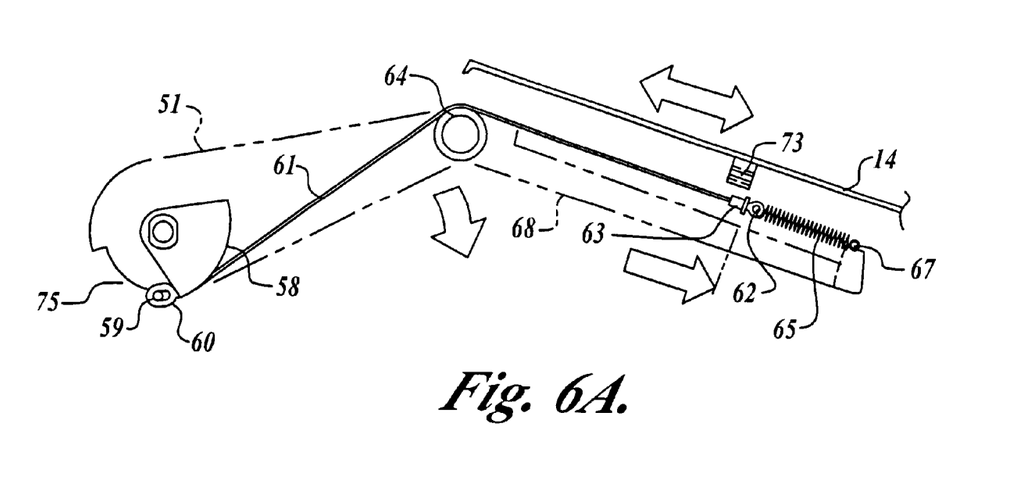
FIG. 6A depicts the cable and spring mechanism during invention deployment.

Referring to FIG. 6A, tray 14 deployment causes cutout 75 to migrate about fitting 59 as tensile forces are exerted through draw cable 61, thence to cable attachment catch 60. This results in cable slackening as cable 61 unwraps from sheave 58. Cable slackening is then transmitted around wrist sheave 64 to spring 65. Spring 65 is depicted in a lightly stretched state as cable slide fitting 63 is caught between draw fitting 73 and cable loop 62. A light spring tension is sufficient to keep cable slide fitting 63 captured within draw fitting 73 and to stretch the spring lightly as the cable 61 pulls from spring anchor 67 of tray slide arm 68.

Figure 6B:
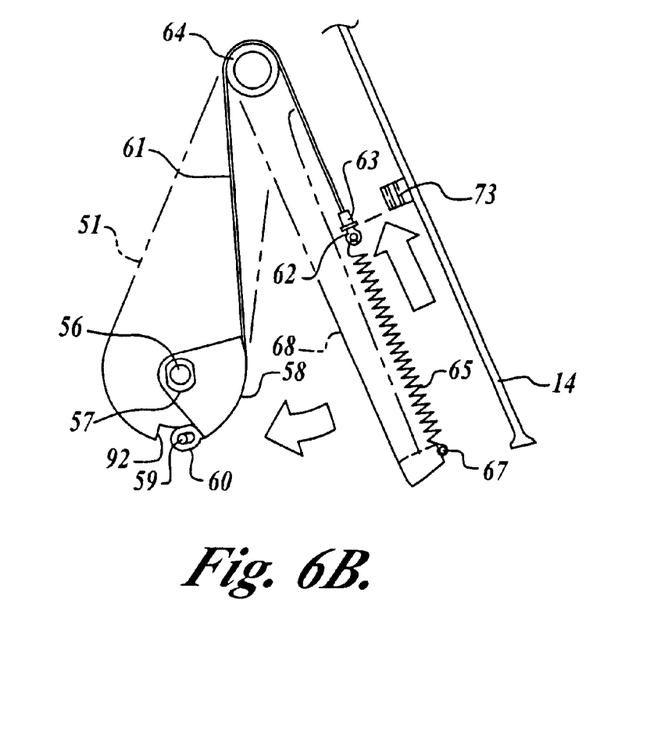
FIG. 6B shows the cable and spring mechanism during invention stowage.

In contrast to deployment of the tray 14, stowage of the tray 14, as depicted in FIG. 6B, results in a maximally tensioned spring as tray slide arm 68 pivots away from draw fitting 73 mounted to the underside of tray 14. Spring 65 is depicted in a highly stretched state as cable slide fitting 63 is caught between draw fitting 73 and cable loop 62. Pushing of tray 14 in a more forward position results in an increased distance between the cable sheave 64 and the double D shaft 56 that is inserted into the aperture 57 depicted in the foreground of arm 51 shown in phantom. The spring 65 is stretched more between draw fitting 73, which has captured tray slide fitting 63, and spring anchor 67.

When a passenger moves the tray 14 forward for stowage, the spring 65 is subjected to increased tension. Cam 58 and arm 51 co-rotate within aperture 57 about pin 59 and double D shaft 56 of the fixed timing pulley 41, limited to the edge 92. More of the circumference cam engages the sheave 58 through aperture 57. Simultaneously, both sheave 58 and arm 51 co-rotate clockwise about pin 59 inserted through cable attachment catch 60. More of the sheave's curved path is committed to the draw cable 61. Increased tension of draw cable 61 results and is transmitted around wrist sheave 64, then to the cable slide fitting 63. Clockwise tensioning rotation is limited to the upper cutout edge 92. Spring 65 is depicted in a more stretched condition for the stowed tray 14.

While the preferred embodiment of the invention has been illustrated and described, as noted above, many changes can be made without departing from the spirit and scope of the invention. For example, the tray 14 may be readily detachable and reattachable to tray legs 13 via a quick release device. The quick release device may be a snap insert fitting, a bayonet breech fitting, a lever release fitting, or any equivalently functional quick release mechanism.

In another alternate embodiment, tray 14, though deployed from a moveable seatback, suitably includes tray legs 13 that are attached to a stationary section of the seat. Such a configuration matches the deployed food tray not susceptible to tilting that occurs when a seat in front of the passenger is reclined.

Accordingly, the scope of the invention is not limited by the disclosure of the preferred embodiments. Instead, the invention should be determined entirely by reference to the claims that follow.

What is claimed is:

1. A table stowable and deployable from a seatback of a passenger seat, the table comprising:
   a substantially planar tray having a first surface and a second surface that is substantially parallel to the first surface, the tray being stowable in the seatback in a first position that is substantially vertical and with the first surface facing outwardly from the seatback;
   a moveable switch arranged to engage the first surface;
   a pair of legs, each of the legs having a first end and a second end, the first end being attached to the passenger seat; and
   means for positioning the tray, the positioning means being attached to the second end of each of the legs, the positioning means slidably urging the first surface of the tray facing upwardly as the tray is deployed from the first position to a second position that is substantially horizontal vertical and with the first surface facing upwardly in response to the moveable switch being turned to clear the first surface.

2. The table of claim 1, wherein the positioning means includes a pair of pulley assemblies having, a first pulley assembly mounted the second surface of the tray, and a second pulley assembly mounted to the second surface of the tray.

3. The table of claim 2, wherein each pulley assembly includes:
   an arm having a first aperture and a second aperture;
   a fixed pulley having a first set of cogs, the fixed pulley mounted in the first aperture;
   a moveable pulley having a second set of cogs, the moveable pulley being mounted in the second aperture, the fixed and moveable pulleys being attached to the first and second apertures of the arm, respectively such that a constant inter-pulley distance is maintained between the fixed and moveable pulleys; and
   a timing belt meshed with the first set of cogs of the fixed pulley and the second set of cogs of the moveable pulley, the timing belt remaining in a non-sliding position but wrapping around the first set of cogs of the fixed pulley at different loci when urged by deploying or stowing the table, such that the moveable pulley migrates along the timing belt and imparts a rotating movement to the moveable pulley.

4. The table of claim 3, wherein the first set of cogs of each pulley assembly are substantially equal, the second set of cogs of each pulley-assembly are substantially equal, such that compatible meshing occurs in concert through each timing belt between the first and second pulley, and wherein a gearing ratio is obtained by varying a distribution of cogs between the fixed and moveable pulleys, the gearing ratio establishing the second position toward a lap of a passenger.

5. The table of claim 3, wherein the first and second pulley assemblies further includes:
   a shaft located centrally from each fixed pulley, the shaft having a double-D configuration, and a stop pin located coaxially off-center to the shaft and projecting from the internal surface of each fixed pulley;
   an axle located centrally from each moveable pulley, the axle having a first smooth surface, a second smooth surface, and a splined end, wherein rotating movement of the moveable pulley imparts a rotation movement to the axle of the moveable pulley; and
   a track guide having a first end and a second end, the track guide located in the arm through which the stop pin engages the track guide, wherein the track guide moves about the stop pin to limits imposed by the first end and second end of the track guide, such that as the first and second end engages against the stop pin of the fixed pulley of the tray deployment and stowage mechanism, a limited position of deployment is established and a limited position of stowage is established, thereby establishing a maximum range of deployment and stowage of the food tray.

6. The table of claim 3, wherein each pulley assembly further includes:
   a cable and spring mechanism connected to the arm and to the first or second side of the tray, wherein both cable and spring mechanisms in each pulley assembly provide tensioning forces in concert with both pulley assemblies to deploy the food tray to the second position with the first surface face up and stow the food tray to the first position into the seatback, with the first surface facing outward towards the passenger.

7. A table stowable and deployable from a seatback of a passenger seat, the table comprising:

a substantially planar tray having a first surface and a second surface that is substantially parallel to the first surface, the tray being stowable in the seatback in a first position that is substantially vertical and with the first surface facing outwardly from the seatback;

a moveable switch rotatably attached to the seatback and arranged to slidably engage the first surface, the tray being held in the first position by the moveable switch;

a pair of legs, each of the legs having a first end and a second end, the first end being attached to the passenger seat;

means for positioning the tray, the positioning means being attached to the second end of each of the legs, the positioning means slidably urging the first surface of the tray facing upwardly as the tray is deployed from the first position to a second position that is substantially horizontal and with the first surface facing upwardly in response to the moveable switch being turned to clear the first surface; and a quick release mechanism for detaching and reattaching to the tray to the pair of legs.

8. The table of claim 7, wherein the positioning means includes a pair of pulley assemblies having, a first pulley assembly mounted the second surface of the tray, and a second pulley assembly mounted to the second surface of the tray.

9. The table of claim 8, wherein each pulley assembly includes:

an arm having a first aperture and a second aperture;

a fixed pulley having a first set of cogs, the fixed pulley being mounted in the first aperture;

a moveable pulley having a second set of cogs, the moveable pulley mounted in the second aperture, the fixed and moveable pulleys being attached to the first and second apertures of the arm, respectively such that constant inter-pulley distance is maintained between the fixed and moveable pulleys; and a timing belt meshed with the first set of cogs of the fixed pulley and the second set of cogs of the moveable pulley, the timing belt remaining in a non-sliding position but wrapping around the first set of cogs of the fixed pulley at different loci when urged by deploying or stowing, such that the moveable pulley migrates along the timing belt and imparts a rotating movement to the moveable pulley.

10. The table of claim 9, wherein the first set of cogs of each pulley assembly are substantially equal, the second set of cogs of each pulley assembly are substantially equal, such that compatible meshing occurs in concert through each timing belt between the first and second pulley, and wherein a gearing ratio is obtained by varying a distribution of cogs between the fixed and moveable pulleys, the gearing ratio establishing the second position toward a lap of a passenger.

11. The table of claim 9, wherein the first and second pulley assemblies further includes:

a shaft located centrally from each fixed pulley, the shaft having a double-D configuration, and a stop pin located coaxially off-center to the shaft and projecting from the internal surface of each fixed pulley;

an axle located centrally from each moveable pulley, the axle having a first smooth surface, a second smooth surface, and a splined end, wherein rotating movement of the moveable pulley imparts a rotation movement to the axle of the moveable pulley; and a track guide having a first end and a second end, the track guide located in the arm through which the stop pin engages the track guide, wherein the track guide moves about the stop pin to limits imposed by the first end and second end of the track guide, such that as the first and second end engages against the stop pin of the fixed pulley of the tray deployment and stowage mechanism, a limited position of deployment is established and a limited position of stowage is established, thereby establishing a maximum range of deployment and stowage of the food tray.

12. The table of claim 9, wherein each pulley assembly further includes:

a cable and spring mechanism connected to the arm and to the first or second side of the tray, wherein both cable and spring mechanisms in each pulley assembly provide tensioning forces in concert with both pulley assemblies to deploy the food tray to the second position with the first surface face up and stow the food tray to the first position into the seatback, with the first surface facing outward towards the passenger.

13. The table of claim 7, wherein the quick release mechanism includes snap insert fittings, bayonet breech fittings, and lever release fittings.

14. A table stowable and deployable from a seatback of a passenger seat, the table comprising:

a substantially planar tray having a first surface and a second surface that is substantially parallel to the first surface, the tray being stowable in the seatback in a first position that is substantially vertical and with the first surface facing outwardly from the seatback;

a moveable switch rotatably attached to the seatback and arranged to slidably engage the first surface, the tray being held in the first position by the moveable switch;

a pair of legs, each of the legs having a first end and a second end, the first end being pivotably attached to a stationary region of the passenger seat;

means for positioning the tray, the positioning means being attached to the second end of each of the legs, the positioning means slidably urging the first surface of the tray facing upwardly as the tray is deployed from the first position to a second position that is substantially horizontal in response to the moveable switch being turned to clear the first surface, such that during deployment and stowage the tray pivots about the stationary region and is not affected by seatback tilting caused by a forward seated passenger; and a quick release mechanism for detaching and reattaching to the tray to the pair of legs.

15. The table of claim 14, wherein the positioning means includes a pair of pulley assemblies having, a first pulley assembly mounted the second surface of the tray, and a second pulley assembly mounted to the second surface of the tray.

16. The table of claim 15, wherein each pulley assembly includes:

an arm having a first aperture and a second aperture;

a fixed pulley having a first set of cogs, the fixed pulley being mounted in the first aperture;

a moveable pulley having a second set of cogs, the moveable pulley mounted in the second aperture, the fixed and moveable pulleys being attached to the first and second apertures of the arm, respectively such that constant inter-pulley distance is maintained between the fixed and moveable pulleys; and a timing belt meshed with the first set of cogs of the fixed pulley and the second set of cogs of the moveable pulley, the timing belt remaining in a non-sliding position but wrapping around the first set of cogs of the fixed pulley at different loci when urged by deploying or stowing, such that the moveable pulley migrates along the timing belt and imparts a rotating movement to the moveable pulley.

17. The table of claim 16, wherein the first set of cogs of each pulley assembly are substantially equal, the second set of cogs of each pulley assembly are substantially equal, such that compatible meshing occurs in concert through each timing belt between the first and second pulley, and wherein a gearing ratio is obtained by varying a distribution of cogs between the fixed and moveable pulleys, the gearing ratio establishing the second position toward a lap of a passenger.

18. The table of claim 17, wherein each pulley assembly further includes:

a cable and spring mechanism connected to the arm and to the first or second side of the tray, wherein both cable and spring mechanisms in each pulley assembly provide tensioning forces in concert with both pulley assemblies to deploy the food tray to the second position with the first surface face up and stow the food tray to the first position into the seatback, with the first surface facing outward towards the passenger.

19. The table of claim 16, wherein the first and second pulley assemblies further includes:

a shaft located centrally from each fixed pulley, the shaft having a double-D configuration, and a stop pin located coaxially off-center to the shaft and projecting from the internal surface of each fixed pulley;

an axle located centrally from each moveable pulley, the axle having a first smooth surface, a second smooth surface, and a splined end, wherein rotating movement of the moveable pulley imparts a rotation movement to the axle of the moveable pulley; and a track guide having a first end and a second end, the track guide located in the arm through which the stop pin engages the track guide, wherein the track guide moves about the stop pin to limits imposed by the first end and second end of the track guide, such that as the first and second end engages against the stop pin of the fixed pulley of the tray deployment and stowage mechanism, a limited position of deployment is established and a limited position of stowage is established, thereby establishing a maximum range of deployment and stowage of the food tray.

20. The table of claim 14, wherein the quick release mechanism includes snap insert fittings, bayonet breech fittings, and lever release fittings.

21. A table stowable and deployable from a seatback of a passenger seat, the table comprising:

a substantially planar tray having a serving surface and a non-serving surface that is substantially parallel to the serving surface, the tray being stowable in a stowed position in the seatback such that the serving surface is substantially vertical and facing outwardly away from the seatback and the non-serving surface is substantially vertical and facing inwardly toward the seatback;

a moveable switch rotatably attached to the seatback and arranged to slidably engage the serving surface, the tray being held in the stowed position by the moveable switch;

a pair of legs, each of the legs having a first end and a second end, the first end being pivotably attached to a stationary region of the passenger seat, the second end being attached to the tray; and means for positioning the tray, the positioning means being attached to the non-serving surface and to the second end of each of the legs, the positioning means slidably urging the serving surface of the tray to face upwards as the tray is moved from the stowed position to a deployed position that is substantially horizontal to the stowed position, such that the serving surface faces upwardly when the tray is in the serving position.

* * * * *